United States Patent
Senior

(10) Patent No.: US 6,466,686 B2
(45) Date of Patent: *Oct. 15, 2002

(54) SYSTEM AND METHOD FOR TRANSFORMING FINGERPRINTS TO IMPROVE RECOGNITION

(75) Inventor: Andrew William Senior, White Plains, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,988

(22) Filed: Jan. 7, 1998

(65) Prior Publication Data

US 2002/0126883 A1 Sep. 12, 2002

(51) Int. Cl.⁷ .................................................. G06K 9/00
(52) U.S. Cl. .................... 382/124; 382/125; 382/206; 382/268; 382/272; 382/276; 382/285
(58) Field of Search ............................... 382/116, 124, 382/125, 206, 209, 173, 190, 268, 272, 276, 285; 356/71; 348/875.34

(56) References Cited

U.S. PATENT DOCUMENTS

| | | | | |
|---|---|---|---|---|
| 3,968,475 A | * | 7/1976 | McMahon | 382/197 |
| 4,151,512 A | | 4/1979 | Riganati et al. | 382/125 |
| 4,310,827 A | | 1/1982 | Asai | 382/192 |
| 4,358,677 A | * | 11/1982 | Ruell et al. | 250/216 |
| 4,577,345 A | | 3/1986 | Abramov | 382/4 |
| 4,817,183 A | * | 3/1989 | Sparrow | 382/26 |
| 5,067,162 A | * | 11/1991 | Driscoll, Jr. et al. | 382/126 |
| 5,140,642 A | * | 8/1992 | Hsu et al. | 382/4 |
| 5,548,394 A | * | 8/1996 | Giles et al. | 356/71 |
| 5,613,013 A | * | 3/1997 | Schuette | 382/124 |
| 5,613,014 A | * | 3/1997 | Eshera et al. | 382/124 |
| 5,799,098 A | * | 8/1998 | Ort et al. | 382/209 |
| 5,852,670 A | * | 12/1998 | Setlak et al. | 382/274 |
| 5,883,971 A | * | 3/1999 | Bolle et al. | 382/263 |
| 5,909,501 A | * | 6/1999 | Thebaud | 382/115 |
| 5,926,555 A | * | 7/1999 | Ort et al. | 382/125 |
| 6,049,621 A | * | 4/2000 | Jain et al. | 382/125 |

OTHER PUBLICATIONS

Nalini K. Ratha et al., "adaptative flow orientation –based feature extraction in fingerprint images" pattern recognition, vol 28. No. 11, pp 1657–1672.*

Nalini K. Ratha et al., "adaptative flow orientation –based feature extraction in fingerprint images" pattern recognition, vol. 28. No 11, pp 1657–1672, Mar. 1995.*

N.K. Ratha, K. Karu, S. Chen and A. K. Jain, "A Real–time Matching System for Large Fingerprint Database", IEEE Transactions on Pattern Analysis and Machine Intelligence, vol. 18, No. 8, Aug. 1996.

\* cited by examiner

Primary Examiner—Leo Boudreau
Assistant Examiner—Sheela Chawan
(74) Attorney, Agent, or Firm—Whitham, Curtis & Christofferson, P.C.; Louis J. Percello

(57) ABSTRACT

A system and method reduces the amount of variation in a fingerprint image due to distortion from elastic deformation of the finger surface and projection onto a planar coordinate system. The amount and extent of distortion is estimated, and the process is inverted in a systematic way, so that the amount of distortion is minimized, and the distortion present is consistent, so that different images of the same print will have very similar distortion and thus matching of the fingerprints will be reliable and unaffected by the distortion.

18 Claims, 4 Drawing Sheets

SYSTEM AND METHOD FOR TRANSFORMING FINGERPRINTS TO IMPROVE RECOGNITION

BACKGROUND OF THE INVENTION

1. Field of the Invention

The present invention generally relates to image processing and, more specifically, to a system and method for transforming fingerprint images to improve recognition by distortion removal.

2. Background Description

For many years, fingerprints have been used to identify individuals. There exist systems for accomplishing automatic authentication or identification of a person using images of the fingerprint. A fingerprint of a person comprises a distinctive and unique ridge pattern structure which allows for such identification of a person among millions. The image of a fingerprint can be recorded in one of a number of ways. Traditionally, fingerprints were recorded by inking the finger and rolling it in a controlled way across a piece of paper. Fingerprints can also be captured by dabbing the inked finger onto paper.

Non-ink processes have also been developed to leave a permanent record, and fingerprints left in sweat and natural oils on a variety of substances can also be enhanced and photographed.

More recently, automatic fingerprint identification (AFI) systems have been developed, and for quick capture of a fingerprint "live scan" devices have been used. These sensors, typically ultrasound, electronic or optical, can capture a fingerprint image directly from the finger without the intermediate paper or ink stage.

Regardless of how the fingerprint image is obtained, the AFI system is used to compare images and determine if a query print matches a stored print in a database. However, the process of imaging by any method inherently introduces a distortion into the representation. Since the distortion for the query print and database print cannot be exactly equal the distortion makes it hard to compare the fingerprints.

Distortion is introduced in a number of ways, but for most sensors it comes about by trying to capture an image of a surface in three dimensions with a two dimensional imaging device. As the finger is pressed against the paper or against the imaging device (typically an integrated circuit, prism or other optical element), the curved, elastic finger is compressed and its surface is deformed into a flat plane (in some cases a surface curved in one direction, but never a surface of the exact shape of the finger). This distortion can be minimized by trained personnel controlling the way the finger is dabbed or rolled, but because of the transformation from a three-dimensional surface to a two-dimensional surface, some distortion is inevitable, and the image will not be consistent when a subsequent print is taken of the same finger.

It is possible to scan the finger shape in free space, without pressing it against a flat surface (e.g., with a laser scanner, a binocular optical system, etc.), but there is still inherent variability in the image shape because the shape of the finger changes (depending on the current water content of the skin for instance).

Thus, it can be seen that fingerprint images are inherently variable because of distortions. These variations make the matching of two fingerprints difficult since two images of the same fingerprint will never be the same. It is thus hard to tell whether differences between two prints are due to noise processes like the distortion mentioned above, or due to a difference in identity between the fingers represented.

Previous AFI systems have not tackled the problem of distortion. While a trained professional fingerprint officer can make allowance for the presence of distortion, computer systems are misled by the distortion which changes the ridge spacings, the distances between features arid the relationships between features (e.g., points collinear on one image may not be on the next because of distortion).

Since AFI systems rely on this kind of representation of fingerprints (inter-feature relations, distances and ridge spacing), the distortion means that prints from the same finger do not look similar and the match between the prints may be overlooked. Historically, such systems have either relied on trained operators to reduce the distortion to a minimum, allowed multiple presentations of a finger to the device, with the hope that one with minimal distortion will be obtained, or the systems have been used in situations where errors are tolerated.

Each of these "solutions" bypasses the real problem and has inherent disadvantages. Trained operators are expensive and defeat much of the object of automating the rest of the system. Multiple presentations are time consuming and annoying to the users, increase false acceptance error rates (allowing an impostor multiple attempts a being recognized) and increase wear on the sensor. Doing nothing about the problem lends to high error rates, either by rejecting legitimate matches, or if the system is made lax to avoid that problem, by falsely accepting more impostors.

SUMMARY OF THE INVENTION

It is therefore an object of the present invention to provide a system and method to reduce the amount of variation in a fingerprint image due to distortion from elastic deformation of the finger surface and projection onto a planar coordinate system.

The invention works by estimating the amount and extent of distortion, and inverting the process in a systematic way, so that:

1. the amount of distortion is minimized; and
2. the distortion present is consistent, so that different images of the same print will have very similar distortion and thus matching of the fingerprints will be reliable and unaffected by the distortion.

According to a preferred embodiment of the invention, there is provided a system for estimating the distortion present in a fingerprint which comprises a computer with one or more central processing units, one or more memories, and one or more input devices. An input device captures one or more images, and the captured image is converted into a representation of the locations of the fingerprint ridges or valleys. An estimating function estimates the distance between two ridges (valleys) on the image, and the estimates of the ridge distances are combined. Based on the combined estimates, the fingerprint image is transformed to remove estimated distortion.

The method according to the invention reduces the amount of distortion present in a fingerprint representation by first capturing a fingerprint image. The captured fingerprint image is distorted by the capture process. The captured fingerprint image is preprocessed, and information of the locations of ridges or valleys in the captured fingerprint image are extracted. The ridge or valley spacing throughout the captured fingerprint image is estimated, and based on this estimate, an average ridge or valley spacing in the captured fingerprint image is estimated. Then, localized warps in the captured fingerprint image are estimated to normalize ridge or valley spacing. Minutiae information from the captured fingerprint image is extracted, and local warps are applied to the estimated minutiae locations without distortion. Finally, existing minutiae matching algorithms are applied to establish fingerprint identity.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
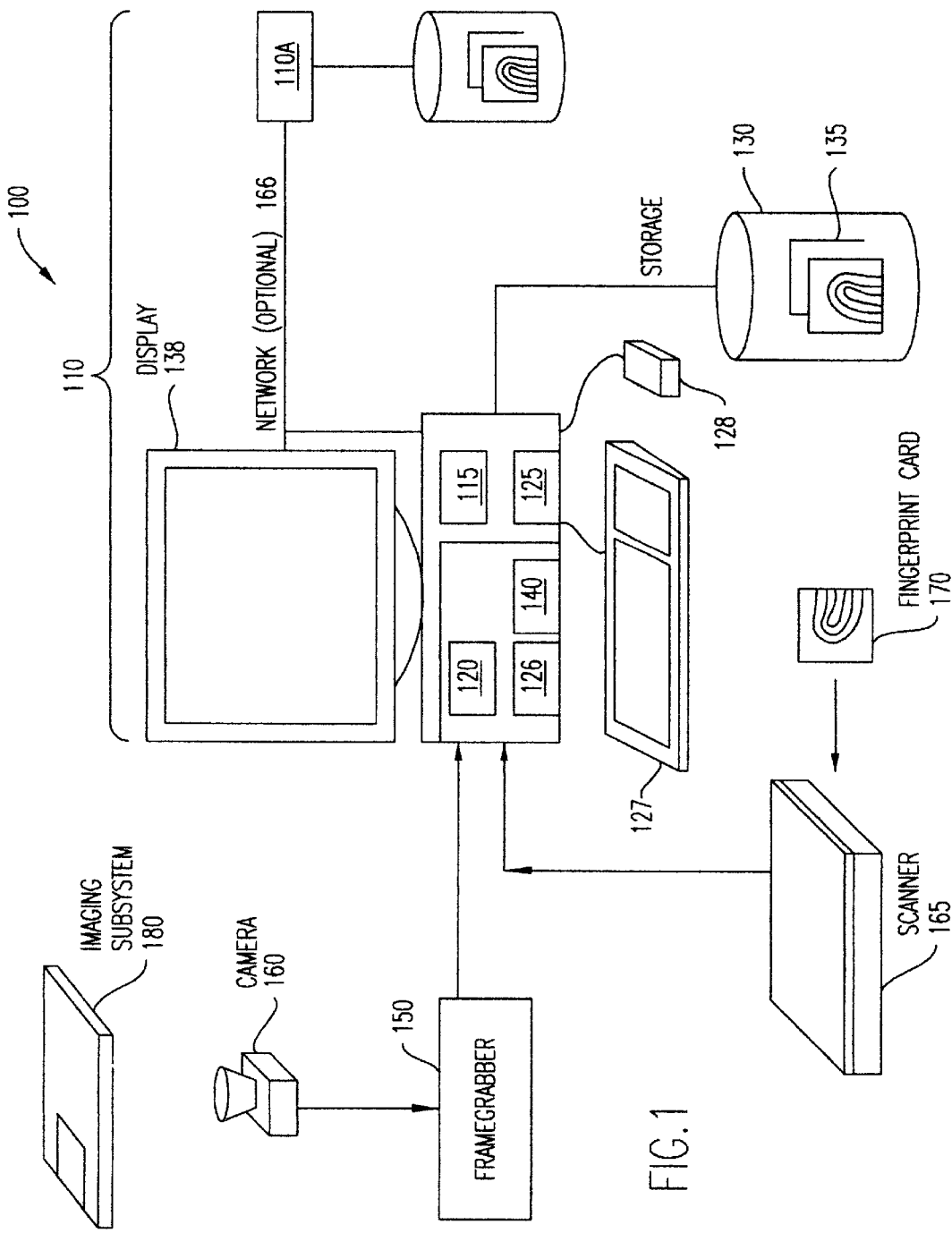
FIG. 1 is a block diagram of one preferred embodiment of the fingerprint distortion removal system according to a preferred embodiment of the invention.

Referring now to the drawings, and more particularly to FIG. 1, there is shown a block diagram representation of a general computer hardware environment that is used as the image processing system 100. This system includes a computer 110 which may be a personal computer (PC), such as one of International Business Machines Corporation (IBM) Personal System/2 (PS/2) family of Personal Computers, a work station, such as IBM's RISC System/6000 workstation or workstations in a network. The invention may be implemented on a variety of other and equivalent hardware platforms such as, for example, an n-WAY IBM SP2 machine with AFS for storage. The SP2 is a collection IBM RS/6000 engines running under a common umbrella and the AIX operating system (IBM's version of the UNIX operating system) and connected with a high speed switch. It could also be implemented on other hardware platforms including, but not limited to, mini computers, stand alone UNIX or Windows NT workstations, or, or mainframes, including IBM AS400 and ES9000 computers.

The computer 110 includes one or more central processing units (CPUs) 115, which may conform to any general computer architecture (e.g., Intel X86 architecture or a reduced instruction set computer (RISC) architecture such as the IBM PowerPC® microprocessor). The CPU 115 is attached to a system bus (not shown) to which are attached a read/write and/or random access memory (RAM) 120 that can include one or more cache memories, a read only memory (ROM) 140, and an input/output (I/O) adapter 125. The RAM 120 provides temporary storage for one or more application program programs 126 containing code and/or data while the ROM typically includes the basic input/output system (BIOS) code of the computer. One or more Direct Access Storage Devices (DASDs), here represented by a hard disk drive 130, are also connected to the CPU by an appropriate adapter (not shown). The hard disk drive 130 typically stores the computer's operating system (OS), such as IBM's OS/2 operating system for PCS or AIX for workstations, and various application programs, data, and/or databases. These databases include intermediate results and fingerprint image data 135. Typically, the I/O adapter 125 has attached to it a keyboard 127, a mouse 128, and/or other user interface devices (not shown).

The computer 110 also can include a display 138, here represented as a cathode ray tube (CRT) display but which may be a liquid crystal display (LCD) or other suitable display which supports a graphic user interface (GUI). The display 138 is connected to the system bus via a display adapter (not shown).

The computer 110 is also interfaced with a frame grabber 150 and an image acquisition device, e.g., a camera 160 and imaging subsystem 180, to capture a live scan fingerprint image onto the computer memory/disk. Alternatively, the computer might be communicating with a document scanning device 165 that scans the fingerprint image from a document like an inked fingerprint card 170. Any other known means can be used to enter a fingerprint image to the database 135, e.g., transmitting an image over a network 166 from other equivalent computers 110A.

The hardware for system 100 and equivalents of these systems are well known to those skilled in the art. Personal System/2, PS/2, OS/2, RISC System/6000, Power Parallel System, SP/x, PowerPC, and IBM are trademarks of the International Business Machines Corporation.

Figure 2:
FIG. 2 shows a fingerprint image taken under controlled conditions, minimizing the distortion.
Figure 3:
FIG. 3 shows the fingerprint image of FIG. 2 with distortion due to elastic deformation.
Figure 4:
FIG. 4 shows the fingerprint of FIG. 3 with the distortions removed by the method according to the invention.

FIGS. 2, 3 and 4 serve to illustrate the problem solved by the present invention. FIG. 2 shows a fingerprint which is largely undistorted. FIG. 3 shows the same fingerprint but badly distorted due to elastic deformation.

It will be observed that the fingerprint in FIG. 3 is in part contracted with respect to the fingerprint in FIG. 2 and, as a result, the distances between ridges have become closer in some parts of the fingerprint and farther apart in other parts of the fingerprint. Therefore, even though the two fingerprints are in fact the same, the distortion of the fingerprint in FIG. 3 makes it difficult in an AFI system to make a positive match with the fingerprint in FIG. 2.

The restored version of the distorted print is shown in FIG. 4. This fingerprint is remapped by the process according to the invention to be a more accurate representation of the fingerprint in FIG. 2.

Figure 5:
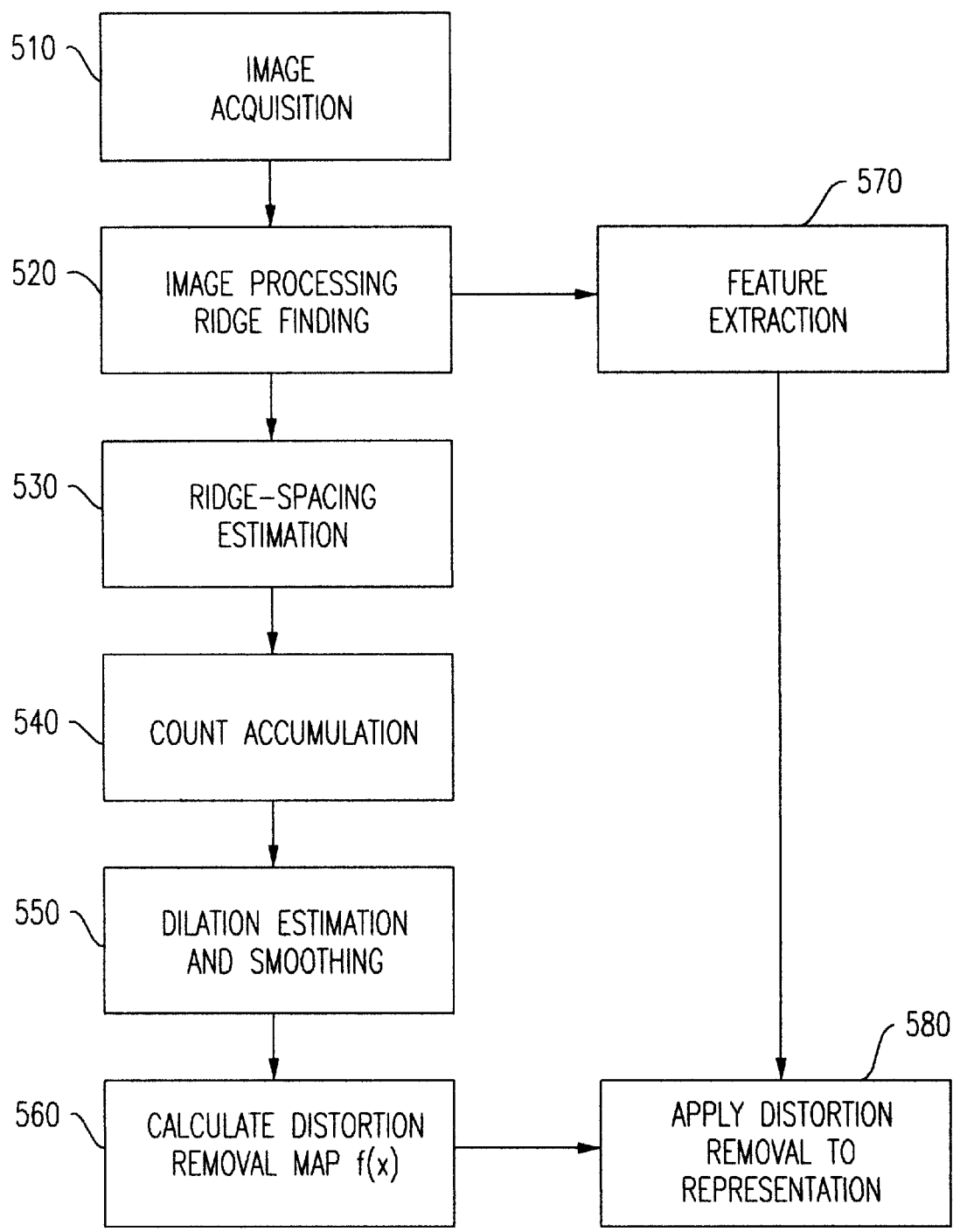
FIG. 5 is a flow diagram of the procedure used to estimate the fingerprint distortion as implemented on the system of FIG. 1.

FIG. 5 is a flow diagram of the method of processing fingerprints implemented on the system shown in FIG. 1. The process begins in function block 510 by acquisition of an image of the fingerprint to be processed. This may be accomplished in any of the several ways described with reference to FIG. 1. The image is processed in function block 520 to perform ridge finding. In this implementation, steps shown in function blocks 510 and 520 correspond to prior art. In particular the processes in function block 520 are described by N. K. Ratha, K. Karu, S. Chen, and A. K. Jam in "A real-time matching system for large fingerprint databases", *IEEE Transactions on Pattern Analysis and Machine Intelligence* 18(8): 799–813 (1996). These processes involve algorithms to identify the locations in the image which correspond to ridges in the fingerprint. The step shown in function block 520 results in a new image whose pixels are in one of two states, indicating whether the pixel is part of a ridge or not. The ridges are one-pixel-wide chains of pixels. U.S. patent application Ser. No. 08/837,069 filed Apr. 11, 1997, by Rodulf Maarten Bolle, Scott Eric Colville, and Sharathchandra U. Pankanti for "SYSTEM AND METHOD FOR DETERMINING RIDGE COUNTS IN FINGERPRINT IMAGE PROCESSING" gives a detailed description of the generation of ridge images. The disclosure of application Ser. No. 08/837,069 is hereby incorporated by reference.

After the image processing of function block 520, the process branches to perform parallel operations. In the main branch, ridge spacing estimation is done in function block 530. Once the ridge spacing estimation occurs as shown in the step in function block 530, a count accumulation is performed in function block 540. Then, as shown in function block 550, dilation estimation and smoothing take place. Finally, as shown in function block 560, a distortion removal map f(x) is calculated. In the parallel branch, from function block 520, a feature extraction function takes place in function block 570. The output of function block 560 is used in function block 580 to apply the calculated distortion removal map f(x) to the output of the feature extraction of function block 570.

In the preferred embodiment, the distortion map is estimated by making an assumption about the nature of the pattern on the fingerprint. The ridge pattern on the fingerprint is assumed to have a uniform spacing, p, between ridges. Thus, where two adjacent ridges run side-by-side, uninterrupted by breaks, bifurcations, crossings or high curvature, the shortest distance from any point on one ridge to the other ridge is assumed to remain approximately constant. It is also assumed that large distortions will only be seen in restricted areas of the print.

Given these assumptions, and a fingerprint image, any place where the distance between adjacent ridges deviates from that observed across most of the print must be an area of distortion. By estimating the local deviations from the mode ridge spacing, the deformation can be estimated.

To estimate both the typical ridge spacing for the whole print, and the local ridge-spacing in each area, the ridge separation is measured at a large number of points in the image in function block 530.

Figure 6:
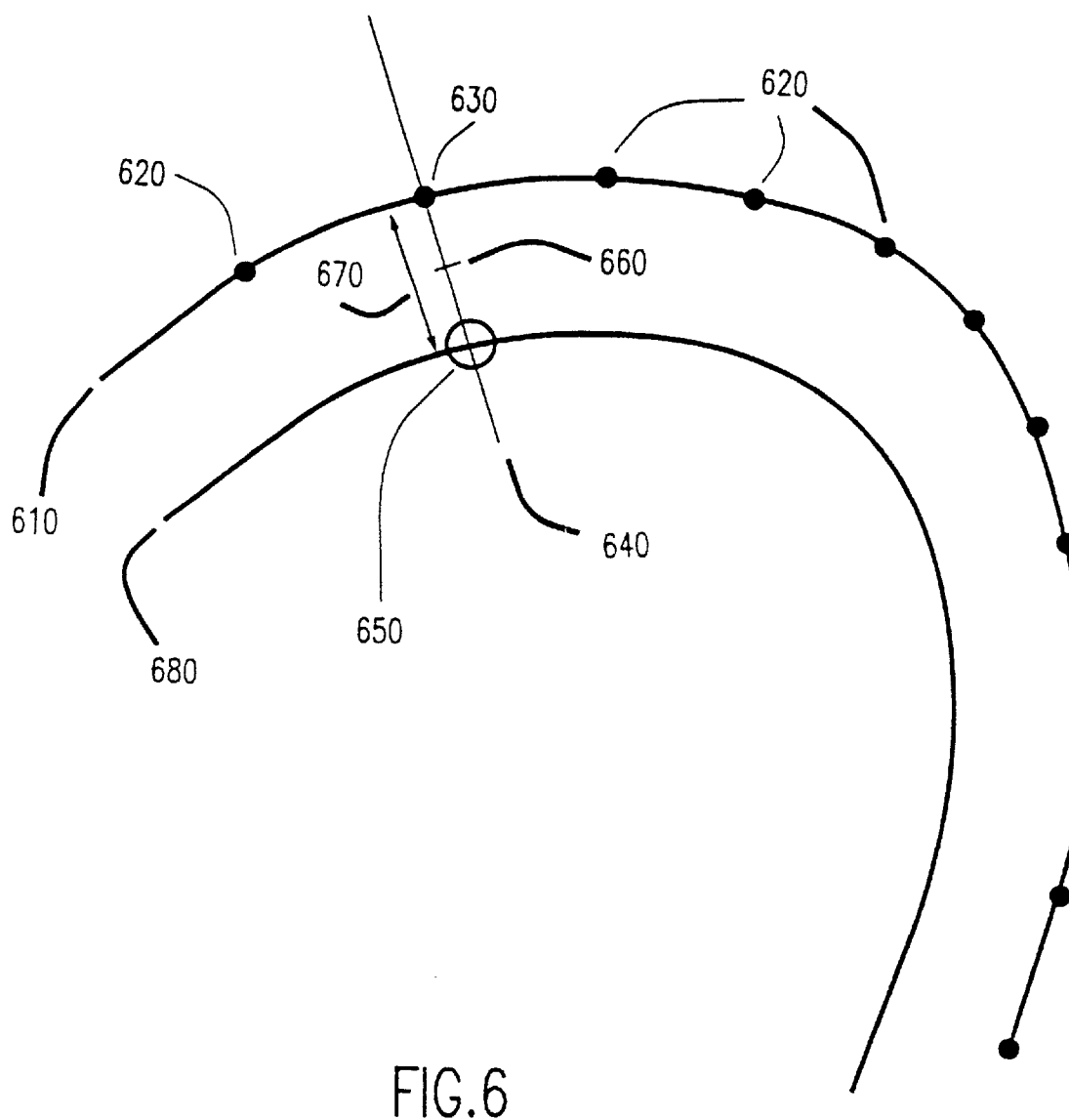
FIG. 6 shows the ridge-spacing measurements used to estimate the distortion.

One method for estimating ridge spacing is best described with reference to FIG. 6. As shown in FIG. 6, a given ridge 610 in the fingerprint can be followed by standard algorithms, whether the ridges are represented as chains of pixels such as those resulting from a thinning algorithm, or as geometric lines or parametric curves. At regular intervals (the "search points" 620) along each ridge, the separation from the nearest ridge 680 is measured as follows.

To measure separation from a given search point 630, the system searches for another ridge in a direction 640 perpendicular to the current ridge at the search point 630. The search can be carried out either to both sides sequentially, or to just one side. At the point of intersection 650 with another ridge 680, the distance 670 from the given search point 630 to the intersection point 650 is measured. If the distance is too large to be that between two adjacent ridges (either by an absolute threshold, from knowing the physical limits on ridge spacings under deformation, or from a preliminary estimate of the ridge-spacing for this fingerprint), the intersection is discarded. If the ridge spacing is plausible, then the distance 670 becomes the ridge spacing estimate and is recorded, together with the location of midpoint 660 between the search point 630 and intersection 650. If no intersection is found, or the intersection is discarded, no ridge-spacing estimate is made for this search line.

By following all the ridges in this manner, and sampling sufficiently frequently, a large number of ridge spacing estimates, r'(x), are accumulated over the whole area, A, of the fingerprint. Averaging these estimates (the preferred embodiment chooses the mode length) gives an estimate, ρ', of the midpoint between the ridges on the original fingerprint.

In addition to the overall estimate, there is now a large number of local ridge-spacing estimates. Differences between the local estimate and the overall ridge spacing indicate distortions. To reduce the effect of noise in the estimates, and to allow an estimate of the local ridge spacing at any point in the image, the local estimates may be smoothed with a technique such as that of Parzen windows (See chapter 4 of Duda & Hart, *Pattern Classification and Scene Analysis*, Wiley Interscience, 1973). In addition, in the preferred embodiment a vector estimate of the distortion is made by resolving the ridge spacing estimates into horizontal and vertical components.

The distortion at each point is modeled as an anisotropic scaling or dilation, which varies as a function of the position x. The separation between two ridges at any point is assumed to have a true length ρ, but to have been scaled by the distortion process At each point, we wish to know the magnitude of this scaling and its direction. Thus, we find the ratio of ρ' to the local estimates, r'(x), resolving into orthogonal components.

$$\frac{\rho'}{r'(x)} = \frac{\rho'}{r'_x(x)}\hat{i} + \frac{\rho'}{r'_y(x)}\hat{j}$$

Where $\hat{i}$ and $\hat{j}$ are the unit vectors in the x and y directions respectively. The unit vector in the direction separation is also found.

$$\hat{r}'(x) = \frac{r'(x)}{\|r'(x)\|}$$

and resolved $\hat{r}'_x = \hat{r}'_x(x)\hat{i} + \hat{r}'_y(x)\hat{j}$.

A set of bins is set up across the fingerprint area, typically one per pixel, or at regular intervals. For each bin, B(x), four sums are accumulated for any local estimates at points x falling into that bin (function block 540). The values accumulated are the sums of $$\frac{\rho'}{r'_x(x)} \quad \text{and} \quad \frac{\rho'}{r'_y(x)}$$

and the counts $\hat{r}'_x(x)$ and $\hat{r}'_y(x)$.

In addition, since a near-vertical ridge spacing estimate provides little information about the horizontal component of the local dilation, it may be decided that the near-vertical or near-horizontal ridge-spacings be discarded or discounted when estimating the horizontal and vertical additions, respectively.

After the sums and counts have been accumulated for all the local estimates, each is smoothed by convolution with a two-dimensional Gaussian kernel, G( ), whose variance is determined by the number of samples available and the amount of error in the estimation process. The smoothed counts are then divided (in function block 550) to give estimates of the components of the dilation vector, d'(x), for each bin:

$$d'(x) = \frac{\int_A \frac{G(x-y)\rho'}{r'_x(y)} dy}{\int_A G(x-y)\hat{r}'_x(y)dy} \hat{i} + \frac{\int_A \frac{G(x-y)\rho'}{r'_y(y)} dy}{\int_A G(x-y)\hat{r}'_y(y)dy} \hat{j}$$

These dilations are estimates of the reciprocals of the stretching magnitudes in the î and ĵ directions for every point in the fingerprint. In the preferred embodiment, to reduce noise, the standard error of the mean is also estimated and the estimated distributions are combined with a prior probability distribution for the expected distortion (which is one), to give a maximum a posteriori estimate for the displacement.

When it is desired to invert the distortion process, any point in the original fingerprint image can be mapped to a new point by inverting the estimated distortion. Points x=(x,y) in the original image are mapped to points x'=f(x). If d'(x) is estimated for every pixel, its value is an estimate for the dimensions of that pixel in the undistorted image, since every image pixel is a unit square to be anisotropically scaled by d'(x), so the actual displacement of point x, is the cumulative sum of these dilations (function block 460). The dilations are accumulated outward from the center. Without loss of generality, assume that the origin is at the center of the image. Then, $$f(x) = \sum_0^x d'_x(x) \hat{i} + \sum_0^y d'_y(x) \hat{j}$$

The distortion removal can be applied to any representation of the fingerprint. The original bitmap image can be scaled by the dilation factors, as can a ridge image or any other derived representation with the same domain (such as an orientation map). A parametric curve representation of the ridges has its coordinates (e.g. the coordinates of the control points of a spline) remapped by f(x). FIGS. 2 and 3 show such a spline representation for the undistorted and distorted fingerprints, respectively. Similarly, feature points located in the image, such as core, delta or minutiae have their locations remapped by f(x), and relative features such as minutia angles or curvatures can be worked out in the new coordinates x'. The result of this remapping is illustrated in FIG. 6 which shows the restored version of the distorted print in FIG. 4. This remapped fingerprint is a more accurate representation of the fingerprint in FIG. 2, making a reliable identification more certain.

The assumption of uniform ridge spacing underlying these procedures is only an approximation. However, for most fingerprints, it seems to be a good approximation for the majority of the area considered. In practice, failure of the assumption does not matter because the "distortion removal" procedure will be applied consistently to all images of a fingerprint. Areas where the ridge spacing is lower than the average will always be enlarged. While the resultant image will then actually be further from the true picture, it will be applied consistently and thus two images of the finger will have the same enlargement and be comparable by a fingerprint matcher, with the advantage that any extra distortion on the prints will have been reduced, making the match easier than if no distortion removal had been carried out.

While the invention has been described in terms of a single preferred embodiment, those skilled in the art will recognize that the invention can be practiced with modification within the spirit and scope of the appended claims. In particular, the procedures for estimating the distortions and inverting them may use a wide variety of methods and not necessarily the particular method described here.

What is claimed is:

1. A computer implemented method for estimating distortion present in a fingerprint, said distortion being variation in a fingerprint image due to elastic deformation of the finger surface and projection onto a planar coordinate system, comprising the steps of:

converting an input image of a fingerprint into a representation of locations of fingerprint ridges or valleys;

estimating distances between ridges or valleys locally throughout at least a selected portion of the representation;

combining the estimates of the distances to generate an estimated average spacing of ridges or valleys of the fingerprint; and combining the average ridge spacing estimate with one or more of the local ridge spacing estimates to derive a measure of the elastic distortion of the fingerprint at one or more points on the fingerprint, wherein said measure is used to reduce said distortion of said fingerprint.

2. The computer implemented method recited in claim 1 further comprising the step of capturing an image of a fingerprint and inputting the captured image to a computer on which the method is implemented, the step of capturing distorting the image of the fingerprint due to elastic deformation.

3. The computer implemented method recited in claim 1 further comprising the step of remapping the captured input image of a fingerprint using the estimated average spacing of ridges or valleys of the fingerprint to produce a substantially undistorted image of the fingerprint.

4. A method for reducing the amount of distortion present in a fingerprint representation, said distortion being variation in a fingerprint image due to elastic deformation of the finger surface and projection onto a planar coordinate system, comprising the steps of:

capturing a fingerprint image, the captured fingerprint image being distorted by the capture process;

preprocessing the captured fingerprint image and extracting information of the locations of ridges or valleys in the captured fingerprint image;

estimating ridge or valley spacing locally throughout at least a selected portion of the captured fingerprint image;

estimating an average ridge or valley spacing in the captured fingerprint image based on the estimate of ridge or valley spacing throughout the image;

estimating localized warps in the captured fingerprint image to normalize ridge or valley spacing by combining the average ridge spacing estimate with one or more of the local ridge spacing estimates;

extracting minutiae information from the captured fingerprint image, applying local warps to the estimated minutiae locations to remove distortion; and applying existing minutiae matching algorithms to establish fingerprint identity.

5. A system for reducing distortion present in a fingerprint representation, said distortion being variation in a fingerprint image due to elastic deformation of the finger surface and projection onto a planar coordinate system, comprising:

a computer for receiving representations of fingerprint images; and a process implemented on a computer for estimating distortion of a fingerprint image by combining an average ridge spacing estimate with one or more local ridge spacing estimates and applying said estimate of distortion of the fingerprint image to remove the distortion by remapping the fingerprint image.

6. The system of claim 5 further comprising an input device connected to the computer and wherein a representation of a fingerprint image is an original fingerprint image captured by the input device.

7. The system of claim 6 wherein the input device is a scanner.

8. The system of claim 6 wherein the input device is an imaging subsystem.

9. The system of claim 5 further comprising a storage device connected to the computer and wherein a representation of a fingerprint image is a fingerprint image stored on the storage device.

10. The system of claim 5 further comprising a network connection to the computer and wherein a representation of a fingerprint image is transmitted to the computer from a remote location.

11. The system of claim 10 further comprising a second computer connected to the network connection at the remote location, the second computer transmitting the representation of a fingerprint image.

12. The system of claim 11 further comprising an input device connected to the second computer and wherein a representation of a fingerprint image is an original fingerprint image captured by the input device.

13. The system of claim 11 further comprising a storage device connected to the second computer and wherein a representation of a fingerprint image is a fingerprint image stored on the storage device.

14. The system of claim 5 further comprising a query process implemented on the computer to compare a remapped fingerprint image with one or more stored fingerprint representations for the purposes of finding a match.

15. The system of claim 14 wherein the stored fingerprint representations have been remapped from representations of original fingerprint images.

16. The system of claim 5 wherein the process implemented on the computer for estimating distortion of a fingerprint image estimates distances between pairs of ridges or valleys of a fingerprint image and combines estimates to give a global estimate of ridge or valley spacing and local estimates of ridge or valley spacing.

17. A system for reducing distortion present in a fingerprint representation, said distortion being variation in a fingerprint image due to elastic deformation of the finger surface and projection onto a planar coordinate system, comprising:

a computer for receiving representations of fingerprint images; and a process implemented on a computer for estimating distortion of a fingerprint image by combining an average ridge spacing estimate with one or more local ridge spacing estimates and applying said estimate of distortion of the fingerprint image to remove the distortion by remapping the fingerprint image, wherein said local ridge spacing estimates are resolved into horizontal and vertical components.

18. A system as in claim 17, wherein said resolution into horizontal and vertical components is derived by modeling said distortion as an anisotropic scaling, said scaling varying as a function of a position x, the separation between two ridges at any point having a true length $\rho$, but said true length having been scaled by the distortion process so that the ratio of an estimated length $\rho'$ to the local estimates, $r'(x)$, is resolved into orthogonal components $$\frac{\rho'}{r'(x)} = \frac{\rho'}{r'_x(x)} \hat{i} + \frac{\rho'}{r'_y(x)} \hat{j}$$

where $\hat{i}$ and $\hat{j}$ are the unit vectors in the x and y directions respectively.

* * * * *